United States Patent
Wu et al.

(10) Patent No.: US 11,768,021 B2
(45) Date of Patent: *Sep. 26, 2023

(54) REFRIGERATOR BASED ON MOLECULAR SIEVE

(71) Applicant: Wuyi University, Jiangmen (CN)

(72) Inventors: Min Wu, Jiangmen (CN); Yijia Wu, Jiangmen (CN); Ji Wu, Jiangmen (CN); Guangwei Chen, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 125 days.

This patent is subject to a terminal disclaimer.

(21) Appl. No.: 17/360,476

(22) Filed: Jun. 28, 2021

(65) Prior Publication Data

US 2022/0381488 A1    Dec. 1, 2022

(30) Foreign Application Priority Data

May 27, 2021 (CN) .......................... 202110583048.X

(51) Int. Cl.
   *F25B 43/00* (2006.01)
   *F25B 39/04* (2006.01)
   *F25B 45/00* (2006.01)

(52) U.S. Cl.
   CPC ............ *F25B 43/003* (2013.01); *F25B 39/04* (2013.01); *F25B 45/00* (2013.01); *F25B 2339/0446* (2013.01); *F25B 2400/13* (2013.01); *F25B 2400/23* (2013.01); *F25B 2500/07* (2013.01)

(58) Field of Classification Search
   CPC ........ F25B 39/04; F25B 43/003; F25B 45/00; F25B 2339/0446; F25B 2400/13; F25B 2400/23; F25B 2500/07
   See application file for complete search history.

(56) References Cited

U.S. PATENT DOCUMENTS

| 2010/0242297 A1* | 9/2010 | Balerdi Azpilicueta ..................... D06F 58/48 34/73 |
| 2018/0320942 A1* | 11/2018 | Hayamizu ................. F25B 1/00 |

FOREIGN PATENT DOCUMENTS

| CN | 208694606 U | * 4/2019 | ........... B01D 53/002 |
| CN | 110420536 A | * 11/2019 | ........... B01D 5/0003 |

OTHER PUBLICATIONS

Yang (CN208694606U) English Translation, Efficient handling of unorganized emission VOCs's device, Apr. 5, 2019, Whole Document (Year: 2019).*

(Continued)

*Primary Examiner* — Larry L Furdge
*Assistant Examiner* — Keith Stanley Myers
(74) *Attorney, Agent, or Firm* — Vivacqua Crane, PLLC

(57) ABSTRACT

A refrigerator based on a molecular sieve, including a first molecular sieve device, a second molecular sieve device, a reversing valve, and a balancing valve, wherein an air flow alternately passes through the first molecular sieve device and the second molecular sieve device through the reversing valve, and then flows back through the balancing valve, so that the first molecular sieve device and the second molecular sieve device are regenerated. The first molecular sieve device and the second molecular sieve device are capable of separating a refrigerant from a depressurized gas, and the refrigerant is condensed after reaching a certain concentration to become a liquid refrigerant, and then enters an evaporator again for refrigeration.

4 Claims, 2 Drawing Sheets

(56) References Cited

OTHER PUBLICATIONS

Zhang (CN110420536A) English Translation, System and method for recovering VOCs at top of tank and reusing nitrogen gas, Nov. 8, 2019, Whole Document (Year: 2019).*

* cited by examiner

REFRIGERATOR BASED ON MOLECULAR SIEVE

CROSS-REFERENCE TO RELATED APPLICATIONS

This application is based on and claims the benefit of priority from Chinese Patent Application No. 202110583048.X, filed on 27 May 2021, the entirety of which is incorporated by reference herein.

TECHNICAL FIELD

The present disclosure relates to the field of refrigerating technologies, and in particular, to a refrigerator based on a molecular sieve.

BACKGROUND

A traditional refrigerating technology employs compressor compression to condense a refrigerant or employs a liquid to absorb the refrigerant, both of which have very high energy consumption.

SUMMARY

Several embodiments of the present disclosure provide a refrigerator based on a molecular sieve capable of refrigerating with lower power consumption.

A refrigerator based on a molecular sieve according to an embodiment of the present disclosure includes:
  an evaporator provided with an inlet and an outlet;
  a first blowing device;
  a condensing assembly, including a first storage tank, a second storage tank, a second blowing device, a first molecular sieve device, a second molecular sieve device, a reversing valve, a first valve, a second valve, and a balancing valve; wherein, the first storage tank is provided with a first air inlet interface, a first air outlet interface, and a liquid outlet; the reversing valve is provided with a second air inlet interface, a second air outlet interface, and a third air outlet interface; the second storage tank is provided with a third air inlet interface, a fourth interface, a fourth air inlet interface, and a fourth air outlet interface; the first molecular sieve device is provided with a first interface and a second interface; the second molecular sieve device is provided with a third interface and a fourth interface; one end of the first blowing device is communicated with the outlet through a first connecting pipe, and the other end of the first blowing device is communicated with the first air inlet interface through a second connecting pipe; the second blowing device is communicated with the first air outlet interface through a third connecting pipe and is communicated with the second air inlet interface through a fourth connecting pipe; the liquid outlet is communicated with the inlet through a fifth connecting pipe; the second air outlet interface is communicated with the first interface through a sixth connecting pipe, and the sixth connecting pipe is provided with the first valve for being communicated with the first storage tank; the third air outlet interface is communicated with the third interface through a seventh connecting pipe, and the seventh connecting pipe is provided with the second valve for being communicated with the first storage tank; the second interface is communicated with the third air inlet interface through an eighth connecting pipe, and the eighth connecting pipe is provided with a first one-way valve allowing an air flow to flow from the second interface to the third air inlet interface; the fourth interface is communicated with the fourth air inlet interface through a ninth connecting pipe, and the ninth connecting pipe is provided with a second one-way valve allowing the air flow to flow from the fourth interface to the fourth air inlet interface; the fourth air outlet interface is communicated with the inlet through a tenth connecting pipe; and one end of the balancing valve is communicated with the second interface through an eleventh connecting pipe, and the other end of the balancing valve is communicated with the third interface through a twelfth connecting pipe;
  a refrigerant arranged in a pipeline of the refrigerator, wherein the refrigerant includes at least one of R290, R32, R404A or R410A;
  a depressurization gas arranged in the pipeline of the refrigerator, wherein the depressurization gas includes at least one of hydrogen or helium;
  a system pressure of the refrigerator being set to be greater than a saturation pressure of the refrigerant at 40° C.; and
  a refrigerator body provided with a refrigerating chamber and a freezing chamber, wherein the evaporator is located in a position of the refrigerator body corresponding to the refrigerating chamber and the freezing chamber, the condensing assembly is located at a lower portion of the refrigerator body, and the first blowing device is located below the refrigerating chamber and the freezing chamber.

The refrigerator based on the molecular sieve according to the embodiment of the present disclosure at least has the following beneficial effects: an air flow alternately passes through the first molecular sieve device and the second molecular sieve device through the reversing valve, and then flows back through the balancing valve, so that the first molecular sieve device and the second molecular sieve device are regenerated. The first molecular sieve device and the second molecular sieve device are capable of separating the refrigerant from the depressurization gas, and the refrigerant is condensed after reaching a certain concentration to become a liquid refrigerant, and then enters the evaporator again for refrigeration. Energy consumption in a condensing process of the refrigerator is lower, thus reducing a production cost of the refrigerator, and a refrigeration requirement of the refrigerator is capable of being met by reasonably arranging positions of the evaporator, the condensing assembly and the first blowing device in the refrigerator body, and selecting reasonable refrigerant and depressurization gas types.

According to some embodiments of the present disclosure, the refrigerator further includes a heat dissipating device, and the heat dissipating device is configured for dissipating heat for the first storage tank.

According to some embodiments of the present disclosure, the heat dissipating device includes a cooling container, at least a part of the first storage tank is located in the cooling container, and the cooling container is configured for placing cooling water to soak at least a part of the first storage tank.

According to some embodiments of the present disclosure, the first air inlet interface is located at a top portion of the first storage tank.

According to some embodiments of the present disclosure, the first air outlet interface is located at an upper portion of the first storage tank and is located below the first air inlet interface.

According to some embodiments of the present disclosure, the fifth connecting pipe include/es a liquid storage section, and the liquid storage section comprises a plurality of U-shaped pipes.

According to some embodiments of the present disclosure, when the refrigerant is the R290, the system pressure of the refrigerator is set to be 28 Bar.

According to some embodiments of the present disclosure, when the refrigerant is the R32, the system pressure of the refrigerator is set to be 50 Bar.

According to some embodiments of the present disclosure, when the refrigerant is the R404A, the system pressure of the refrigerator is set to be 36 Bar.

According to some embodiments of the present disclosure, when the refrigerant is the R410A, the system pressure of the refrigerator is set to be 40 Bar.

Part of the additional aspects and advantages of the present disclosure will be given in part in the following description, and will become apparent in part from the following description, or will be learned through the practice of the present disclosure.

BRIEF DESCRIPTION OF THE DRAWINGS

The present disclosure will be further explained with reference to the accompanying drawings and embodiments hereinafter, wherein.

Figure 1:
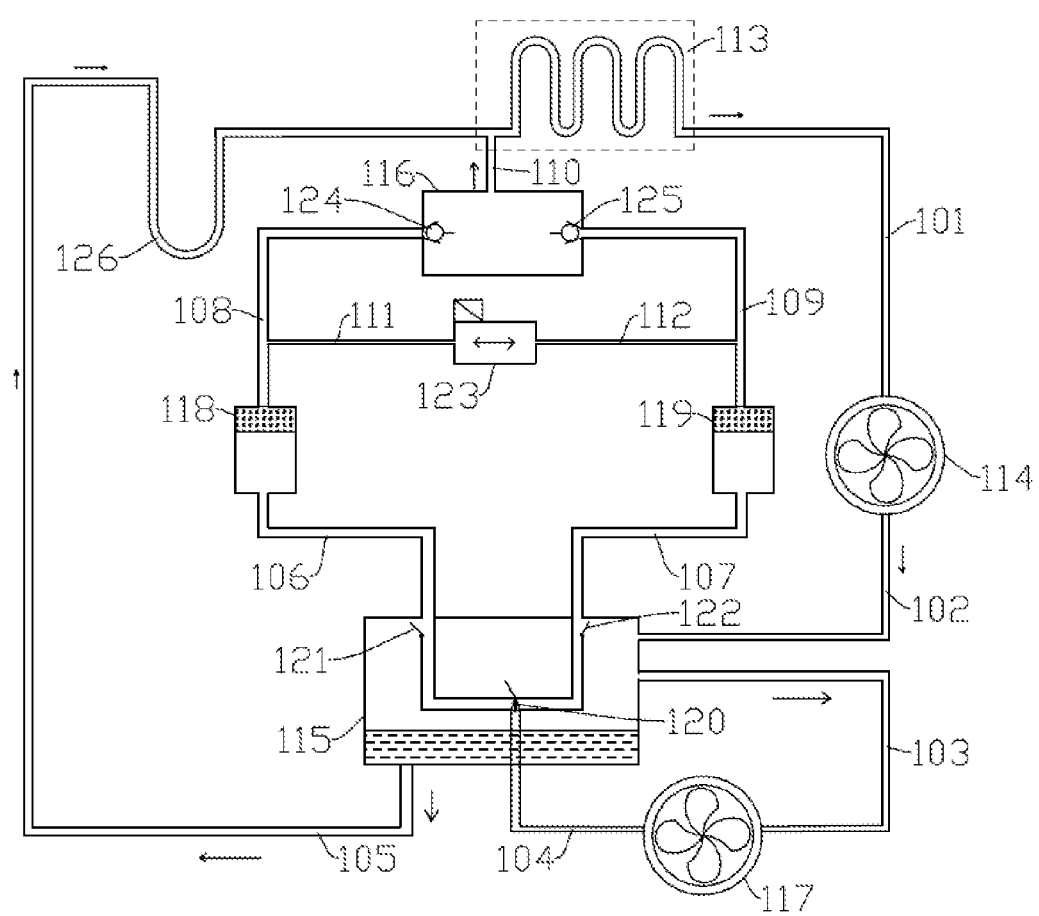
FIG. 1 is a principle diagram of a refrigerator according to an embodiment of the present disclosure.

REFERENCE NUMERALS 101 refers to first connecting pipe; 102 refers to second connecting pipe; 103 refers to third connecting pipe; 104 refers to fourth connecting pipe; 105 refers to fifth connecting pipe; 106 refers to sixth connecting pipe; 107 refers to seventh connecting pipe; 108 refers to eighth connecting pipe; 109 refers to ninth connecting pipe; 110 refers to tenth connecting pipe; 111 refers to eleventh connecting pipe; 112 refers to twelfth connecting pipe; 113 refers to evaporator; 114 refers to first blowing device; 115 refers to first storage tank; 116 refers to second storage tank; 117 refers to second blowing device; 118 refers to first molecular sieve device; 119 refers to second molecular sieve device; 120 refers to reversing valve; 121 refers to first valve; 122 refers to second valve; 123 refers to balancing valve; 124 refers to first one-way valve; 125 refers to second one-way valve; and 126 refers to liquid storage section; and 201 refers to freezing chamber; and 202 refers to refrigerating chamber.

DETAILED DESCRIPTION

The embodiments of the present disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the present disclosure, but should not be construed as limiting the present disclosure.

In the description of the present disclosure, it shall be understood that the orientation or position relation related to the orientation description, such as the orientation or position relation indicated by the upper, lower, front, rear, left, right, etc., is based on the orientation or position relation shown in the drawings, which is only used for convenience of description of the present disclosure and simplification of description instead of indicating or implying that the indicated device or element must have a specific orientation, and be constructed and operated in a specific orientation, and thus shall not be understood as a limitation to the present disclosure.

In the description of the present disclosure, the meaning of several refers to be one or more, and the meaning of multiple refers to be more than two. The meanings of greater than, less than, more than, etc., are understood as not including this number, while the meanings of above, below, within, etc., are understood as including this number. If there is a description to the first and second, it is only for the purpose of distinguishing technical features, and shall not be understood as indicating or implying relative importance, implicitly indicating the number of the indicated technical features or implicitly indicating the order of the indicated technical features.

In the description of the present disclosure, unless otherwise clearly defined, words such as setting, installation, connection, etc., shall be understood broadly, and those skilled the art can reasonably determine the specific meanings of the above words in the present disclosure in combination with the specific contents of the technical solution.

With reference to FIG. 1, a refrigerator based on a molecular sieve according to an embodiment of the present disclosure includes an evaporator 113, a first blowing device 114, and a condensing assembly. The evaporator 113 is provided with an inlet and an outlet. The condensing assembly includes a first storage tank 115, a second storage tank 116, a second blowing device 117, a first molecular sieve device 118, a second molecular sieve device 119, a reversing valve 120, a first valve 121, a second valve 122, and a balancing valve 123. The first storage tank 115 is provided with a first air inlet interface, a first air outlet interface, and a liquid outlet. The reversing valve 120 is provided with a second air inlet interface, a second air outlet interface, and a third air outlet interface. The second storage tank 116 is provided with a third air inlet interface, a fourth air inlet interface, and a fourth air outlet interface. The first molecular sieve device 118 is provided with a first interface and a second interface. The second molecular sieve device 119 is provided with a third interface and a fourth interface. One end of the first blowing device 114 is communicated with the outlet through a first connecting pipe 101, and the other end of the first blowing device is communicated with the first air inlet interface through a second connecting pipe 102. The second blowing device 117 is communicated with the first air outlet interface through a third connecting pipe 103 and is communicated with the second air inlet interface through a fourth connecting pipe 104. The liquid outlet is communicated with the inlet through a fifth connecting pipe 105. The second air outlet interface is communicated with the first interface through a sixth connecting pipe 106, and the sixth connecting pipe 106 is provided with the first valve 121 for being communicated with the first storage tank 115. The third air outlet interface is communicated with the third interface through a seventh connecting pipe 107, and the seventh connecting pipe 107 is provided with the second valve 122 for being communicated with the first storage tank 115. The second interface is communicated with the third air inlet interface through an eighth connecting pipe 108, and the eighth connecting pipe 108 is provided with a first one-way valve 124 allowing an air flow to flow from the second interface to the third air inlet interface. The fourth interface is communicated with the fourth air inlet interface through a ninth connecting pipe 109, and the ninth connecting pipe 109 is provided with a second one-way valve 125 allowing the air flow to flow from the fourth interface to the fourth air inlet interface. The fourth air outlet interface is communicated with the inlet through a tenth connecting pipe 110. One end of the balancing valve 123 is communicated with the second interface through an eleventh connecting pipe 111, and the other end of the balancing valve is communicated with the third interface through a twelfth connecting pipe 112.

It shall be understood a refrigerant and a depressurization gas are injected into the refrigerator, and a refrigerating cycle is implemented through cyclic conversion between a gaseous state and a liquid state of the refrigerant.

Specifically, a liquid refrigerant and the depressurization gas are mixed in the evaporator 113, and the evaporator 113 provides an evaporating space in a position where the liquid refrigerant and the depressurization gas start to be mixed. No gaseous refrigerant exists in the mixing position, which means that a partial pressure of the gaseous refrigerant is zero, so that the liquid refrigerant is inevitably evaporated to form the gaseous refrigerant. In this process, the evaporator 113 absorbs heat in air to implement refrigeration.

The gaseous refrigerant and the depressurization gas are mixed in the evaporator 113 to form a mixed gas, and the mixed gas enters the condensing assembly, with a flow direction controlled by the reversing valve 120, and then alternately passes through the first molecular sieve device 118 and the second molecular sieve device 119. The first molecular sieve device 118 and the second molecular sieve device 119 both include a molecular sieve. The molecular sieve has a function of sieving molecules, and is provided with a plurality of channels with a uniform aperture and orderly arranged holes in structure. The molecular sieves with different apertures separate molecules with different sizes and shapes. The first molecular sieve device 118 and the second molecular sieve device 119 are set to allow the depressurization gas to pass through and prevent the refrigerant from passing through, so as to separate the mixed gas.

For example, the refrigerant is selected to be ammonia, and the depressurization gas is selected to be hydrogen or helium. A molecular diameter of the hydrogen is 0.289 nm, which is namely 2.89 A. A molecular diameter of the helium is 0.26 nm, which is namely 2.6 A. A molecular diameter of the ammonia is 0.444 nm, which is namely 4.44 A. Therefore, the first molecular sieve device 118 and the second molecular sieve device 119 are selected to be 3 A or 4 A molecular sieves, both of which may effectively separate the hydrogen from the ammonia, or separate the helium from the ammonia.

The essence of liquification of the gaseous refrigerant is that when a relative humidity of the gaseous refrigerant reaches 100%, the gaseous refrigerant is inevitably liquefied. Therefore, after the mixed gas is separated, only the gaseous refrigerant remains in the condensing assembly, or the gaseous refrigerant and the liquid refrigerant exist at the same time. When the first blowing device 114 continuously leads the mixed gas into the first storage tank 115, the second blowing device 117 delivers the mixed gas to the first molecular sieve device 118 and the second molecular sieve device 119 to sieve the remaining refrigerant. After the relative humidity of the gaseous refrigerant reaches 100%, the gaseous refrigerant may be condensed into the liquid refrigerant.

Microscopically, evaporation is a process of allowing liquid molecules to leave from a liquid surface. Since the molecules in the liquid move constantly and randomly, average kinetic energy of the molecules is compatible with a temperature of the liquid itself. Due to random movement and collision of the molecules, there are always some molecules with kinetic energy greater than the average kinetic energy at any moment. If these molecules with sufficient kinetic energy are close to the liquid surface, and the kinetic energy of these molecules is greater than power required to overcome an attractive force between the molecules in the liquid when the molecules fly out, these molecules can fly out from the liquid surface and become vapor of the liquid, which is the evaporation. After colliding with other molecules, the molecules flying out may return to the liquid surface or enter an interior of the liquid. If the molecules flying out are more than the molecules flying back, the liquid is evaporated. When there are more molecules in a space, the molecules flying back can be increased. When the molecules flying out are equal to the molecules flying back, the liquid is in a saturated state, and a pressure at the moment is called a saturation pressure Pt of the liquid at the temperature. At the moment, if a number of gaseous molecules of the substance in the space is artificially increased, a number of the molecules flying back may be greater than that of the molecules flying out, so that condensation occurs.

The following describes a working process of the refrigerator with the ammonia as the refrigerant and the hydrogen as the depressurization gas.

Under the action of the second blowing device 117, the mixed gas of the ammonia and the hydrogen in the first storage tank 115 is pumped out and blown into the reversing valve 120. The reversing valve 120 controls an air flow to enter the first molecular sieve device 118 along the sixth connecting pipe 106 first, the first valve 121 is closed, the second valve 122 is opened, and a pressure at the sixth connecting pipe 106 is greater than that at the seventh connecting pipe 107. The mixed gas is filtered by the molecular sieve of the first molecular sieve device 118, the ammonia remains in the first molecular sieve device 118, the hydrogen mainly passes through the eighth connecting pipe 108 to the first one-way valve 124 and then enters the second storage tank 116, and a small part of the hydrogen flows into the balancing valve 123 from the eleventh connecting pipe 111. The hydrogen entering the second storage tank 116 flows out to the evaporator 113 along the tenth connecting pipe 110, the hydrogen flowing into the balancing valve 123 passes through the twelfth connecting pipe 112 and the ninth connecting pipe 109 and then enters the second molecular sieve device 119, and the residual ammonia in the molecular sieve device passes through the seventh connecting pipe 107 and the second valve 122 and then is pushed into the first storage tank 115, thus regenerating the molecular sieve of the second molecular sieve device 119.

With an increased concentration of the ammonia in the first storage tank 115, the ammonia is condensed into liquid ammonia and releases heat, and the liquid ammonia flows out through the fifth connecting pipe 105. In a process of entering the evaporator 113, a pressure is gradually decreased, and the liquid ammonia is vaporized and absorbs heat, which is mixed with the hydrogen flowing out from the tenth connecting pipe 110 in the evaporator 113. The mixed gas flows along the first connecting pipe 101 and continues to enter the first storage tank 115 along the second connecting pipe 102 with the help of the first blowing device 114, and then, under an action of the second blowing device 117, the mixed gas flows out from the third connecting pipe 103, thus completing one refrigerating cycle.

After a period of time, a direction is changed by the reversing valve 120, so that the mixed gas blown in by the second blowing device 117 flows to the second molecular sieve device 119, the first valve 121 is opened, the second valve 122 is closed, and a pressure at the sixth connecting pipe 106 is lower than that at the seventh connecting pipe 107. The mixed gas is filtered by the molecular sieve of the second molecular sieve device 119, the ammonia remains in the second molecular sieve device 119, the hydrogen mainly passes through the ninth connecting pipe 109 to the second one-way valve 125 and then enters the second storage tank 116, and a small part of the hydrogen flows into the balancing valve 123 from the twelfth connecting pipe 112. The hydrogen entering the second storage tank 116 flows out to the evaporator 113 along the tenth connecting pipe 110, the hydrogen flowing into the balancing valve 123 passes through the eleventh connecting pipe 111 and the eighth connecting pipe 108 and then enters the first molecular sieve device 118, and the residual ammonia in the molecular sieve device passes through the sixth connecting pipe 106 and the first valve 121 and then is pushed into the first storage tank 115, thus regenerating the molecular sieve of the second molecular sieve device 118.

An air flow alternately passes through the first molecular sieve device 118 and the second molecular sieve device 119 through the reversing valve 120, and then flows back through the balancing valve 123, so that the first molecular sieve device 118 and the second molecular sieve device 119 are regenerated. The first molecular sieve device 118 and the second molecular sieve device 119 are capable of separating the refrigerant from the depressurization gas, and the refrigerant is condensed after reaching a certain concentration to become the liquid refrigerant, and then enters the evaporator 113 again for refrigeration. Energy consumption required in a condensing process of the refrigerator is lower, thus reducing a production cost of the refrigerator.

According to some embodiments of the present disclosure, the first blowing device 114 includes a ventilator, and the second blowing device 117 includes a ventilator. The ventilator does not need a large compression ratio like a compressor of a conventional refrigerator, but only needs to lead the mixed gas into the first storage tank 115, and the condensation is implemented by a concentration change of the refrigerant itself. The ventilator generally has features of a low pressure difference and a large flow rate. Certainly, the first blowing device 114 and the second blowing device 117 may also be compressors, and power of the compressors may be smaller than that of a conventional compressor.

According to some embodiments of the present disclosure, the first air inlet interface is located at a top portion of the first storage tank 115. The first blowing device 114 supplements the mixed gas to the first storage tank 115, which is beneficial for protecting a pressure stability of a system and reducing an influence caused by one-side flowing of the air flow. A mass of the depressurization gas is less than that of the refrigerant, so that the depressurization gas may flow upwardly, and the refrigerant may go down. The first air inlet interface is located at a top portion of the first storage tank 115, which can reduce an influence on the concentration of the refrigerant at the lower portion of the first storage tank 115.

According to some embodiments of the present disclosure, the first air outlet interface is located at an upper portion of the first storage tank 115 and is located below the first air inlet interface. The first air outlet interface is close to the first air inlet interface, which can facilitate the second blowing device 117 to pump the mixed gas blown in by the first blowing device 114 into the reversing valve 120 to participate in the refrigerating cycle, so as to avoid pumping out the liquid ammonia at the bottom.

According to some embodiments of the present disclosure, the liquid outlet is located at a bottom portion of the first storage tank 115, which facilitates the liquefied refrigerant to flow out.

According to some embodiments of the present disclosure, the refrigerator further includes a heat dissipating device, and the heat dissipating device is configured for dissipating heat for the first storage tank 115. A heat dissipating efficiency of the first storage tank 115 can be effectively improved by arranging the heat dissipating device, and then a condensing efficiency of the condensing assembly is improved.

According to some embodiments of the present disclosure, the heat dissipating device includes a cooling container (not shown in the drawings), at least a part of the first storage tank 115 is located in the cooling container, and the cooling container is configured for placing cooling water to soak at least a part of the first storage tank 115, thus increasing a heat dissipating contact area. In order to improve a heat dissipating effect, a water inlet pipe and a water outlet pipe may be connected onto the cooling container to keep the cooling water in a certain stable range. Since a temperature difference of the first storage tank 115 is small, a cooling water pipe may adopt a normal temperature water source, which is convenient to take. It shall be understood the heat dissipating device may also adopt an air cooling device or the cooling water pipe, or the air cooling device may be used together with the cooling water pipe.

According to some embodiments of the present disclosure, the fifth connecting pipe 105 includes a liquid storage section 126, and the liquid storage section 126 includes a plurality of U-shaped pipes. More refrigerant can be stored and an occupied space of the fifth connecting pipe 105 is reduced by arranging the U-shaped pipes.

According to some embodiments of the present disclosure, the first valve 121 and/or the second valve 122 are electronic valves. Setting as the electronic valves is convenient for controlling automatically. It shall be understood the first valve 121 and the second valve 122 may also be set as mechanical valves.

Figure 2:
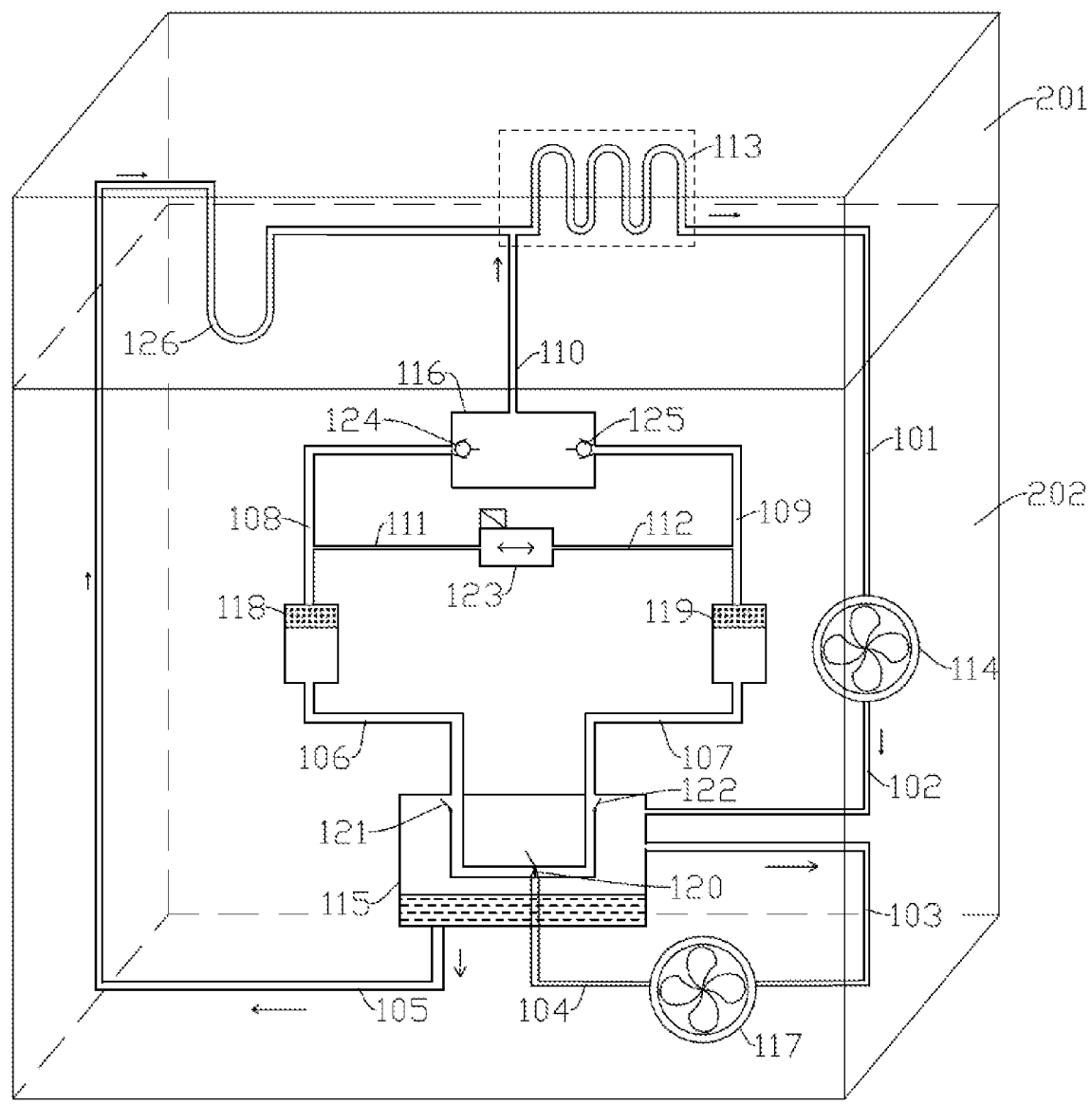
FIG. 2 is a schematic diagram of the refrigerator based on the molecular sieve according to the embodiment of the present disclosure.

With reference to FIG. 2, it is to understood that the refrigerator includes a refrigerator body. The refrigerator body includes a freezing chamber 201 and a refrigerating chamber 202. The evaporator 113 is located in a position of the refrigerator body corresponding to the refrigerating chamber 202 and the freezing chamber 201, which facilitates refrigeration and reduces loss of refrigeration capacity. It shall be understood a refrigerating mode of the evaporator 113 may be direct cooling or air cooling.

The condensing assembly is located at a lower portion of the refrigerator body, which may be convenient for being connected with the cooling water.

The first blowing device 114 is located below the refrigerating chamber 202 and the freezing chamber 201, which facilitates using a space at the lower portion of the refrigerator body and reduces vibration noise at the same time.

The refrigerator is a refrigerating device that keeps a constant low temperature, and is also a civil product that keeps foods or other articles in a constant low temperature state. Although a basic working principle of the present disclosure is introduced above, creative works are still required to select a solution suitable for the refrigerator therefrom, otherwise a refrigerating temperature may be excessively high or excessively low, which cannot meet a use requirement of the refrigerator.

After continuous screening and verification, the present disclosure proposes that, in some embodiments, the refrigerant includes at least one of R290 (propane), R32 (difluoromethane), R404A (a pentafluoroethane/trifluoroethane/tetrafluoroethane mixture) or R410A (composed of two quasi-azeotropic mixtures R32 and R125, each of which accounts for 50%), and the depressurization gas includes at least one of the hydrogen or the helium.

The following table shows a relationship between a system pressure and a cold-end refrigerating temperature required for different refrigerants.

| Refrigerant | Saturation pressure corresponding to 40° C. | System pressure | Cold-end refrigerating temperature |
| --- | --- | --- | --- |
| R290 | 14 Bar | 28 Bar | −25° C. to 5° C. |
| R32 | 25 Bar | 50 Bar | −23° C. to 5° C. |
| R404A | 18 Bar | 36 Bar | −20° C. to 5° C. |
| R410A | 20 Bar | 40 Bar | −24° C. to 5° C. |

Taking the refrigerant being the R290 and the depressurization gas being the hydrogen as an example, according to an h-s diagram (a pressure-enthalpy diagram) of the R290 gas, a saturation pressure Pt of the R290 is 14 bar at 40° C., so that a standby pressure of the refrigerator is 2 Pt, which is namely 28 bar. Therefore, a concentration of the R290 gas in the condensing assembly is increased continuously. When the concentration of the R290 gas reaches 50%, which means that a partial pressure of the R290 gas reaches 1 Pt, the R290 gas starts to be condensed to form liquid R290. The liquid R290 flows out from the liquid outlet and enters the evaporator 113, the hydrogen also enters the evaporator 113, and the liquid R290 and the hydrogen are mixed in the evaporator 11. In the evaporator 113, since the hydrogen is light, the hydrogen may fully fill the evaporator 113. Therefore, a partial pressure of gaseous R290 is close to 0, and molecules of the liquid R290 may enter the hydrogen to form the R290 gas, which means that the liquid R290 may be evaporated. After the R290 gas and the hydrogen are mixed, the mixed gas enters the condensing assembly to implement the circulating cycle. In the embodiment, the cold end refrigerating temperature is −25° C. to 5° C.

It is to be noted that the higher the selected temperature corresponding to the saturation pressure of the refrigerant is, the higher the required system pressure is, while the lower the temperature is, the higher the heat dissipating requirement of the condensing assembly is, both of which can increase a manufacturing cost. After verification by many tests on the present disclosure, it is found that when the selected temperature is 40° C., the system pressure and the heat dissipating requirement can be balanced, thus effectively reducing a cost.

In addition, the system pressure of the refrigerator may be set to be greater than the saturation pressure of the refrigerant at 40° C., and the system pressure of the refrigerator is set to be twice the saturation pressure of the refrigerant at 40° C., which can further improve a refrigerating cycle efficiency and reduce a time required for refrigeration without increasing a manufacturing difficulty and a manufacturing cost excessively at the same time.

Although the embodiments of the present disclosure are described in detail with reference to the drawings above, the present disclosure is not limited to the above embodiments, and variations can be made within the knowledge scope of those of ordinary skills in the art without departing from the purposes of the present disclosure.

We claim:

1. A refrigerator based on a molecular sieve, comprising:
an evaporator provided with an inlet and an outlet;
a first blowing device;
a condensing assembly, comprising a first storage tank, a second storage tank, a second blowing device, a first molecular sieve device, a second molecular sieve device, a reversing valve, a first valve, a second valve, and a balancing valve; wherein, the first storage tank is provided with a first air inlet interface, a first air outlet interface, and a liquid outlet; the reversing valve is provided with a first air inlet interface, a first air outlet interface, and a second air outlet interface; the second storage tank is provided with a first air inlet interface, a second air inlet interface, and a first air outlet interface; the first molecular sieve device is provided with a first interface and a second interface; the second molecular sieve device is provided with a first interface and a second interface; one end of the first blowing device is communicated with the outlet through a first connecting pipe, and the other end of the first blowing device is communicated with the first air inlet interface of the first storage tank through a second connecting pipe; the second blowing device is communicated with the first air outlet interface of the first storage tank through a third connecting pipe and is communicated with the first air inlet interface of the reversing valve through a fourth connecting pipe; the liquid outlet is communicated with the inlet through a fifth connecting pipe; the first air outlet interface of the reversing valve is communicated with the first interface of the first molecular sieve device through a sixth connecting pipe, and the sixth connecting pipe is provided with the first valve for being communicated with the first storage tank; the second air outlet interface of the reversing valve is communicated with the first interface of the second molecular sieve device through a seventh connecting pipe, and the seventh connecting pipe is provided with the second valve for being communicated with the first storage tank; the second interface of the first molecular sieve device is communicated with the first air inlet interface of the second storage tank through an eighth connecting pipe, and the eighth connecting pipe is provided with a first one-way valve allowing an air flow to flow from the second interface of the first molecular sieve device to the first air inlet interface of the second storage tank; the second interface of the second molecular sieve device is communicated with the second air inlet interface of the second storage tank through a ninth connecting pipe, and the ninth connecting pipe is provided with a second one-way valve allowing the air flow to flow from the second interface of the second molecular sieve device to the second air inlet interface of the second storage tank; the first air outlet interface of the second storage tank is communicated with the inlet through a tenth connecting pipe; and one end of the balancing valve is communicated with the second interface of the first molecular sieve device through an eleventh connecting pipe, and the other end of the balancing valve is communicated with the first interface of the second molecular sieve device through a twelfth connecting pipe;

a refrigerant arranged in a pipeline of the refrigerator, wherein the refrigerant comprises at least one of R290, R32, R404A or R410A;

a depressurization gas arranged in the pipeline of the refrigerator, wherein the depressurization gas comprises at least one of hydrogen or helium; and a refrigerator body provided with a refrigerating chamber and a freezing chamber, wherein the evaporator is located in a position of the refrigerator body corresponding to the refrigerating chamber and the freezing chamber, the condensing assembly is located at a lower portion of the refrigerator body, and the first blowing device is located below the freezing chamber.

2. The refrigerator based on the molecular sieve according to claim 1, wherein the first air inlet interface of the first storage tank is located at a top portion of the first storage tank.

3. The refrigerator based on the molecular sieve according to claim 2, wherein the first air outlet interface of the first storage tank is located at an upper portion of the first storage tank and is located below the first air inlet interface of the first storage tank.

4. The refrigerator based on the molecular sieve according to claim 1, wherein the fifth connecting pipe comprises a liquid storage section, and the liquid storage section comprises a plurality of U-shaped pipes.

* * * * *